United States Patent [19]
Kruglikov et al.

[11] 3,894,981
[45] July 15, 1975

[54] METHOD OF PRODUCING PHENOLIC MOULDING MATERIALS

[76] Inventors: Anatoly Abramovich Kruglikov, ulitsa Vyazovskaya 9, kv. 9; Vadim Anatolievich Iliin, ulitsa Parkhomenko 27, kv. 6; Nelli Vsevolodovna Obraztsova, ulitsa Parkhomenko, 27, kv. 52; Vladimir Aronovich Strupinsky, ulitsa Tsiolkovskogo, 11, kv. 26; Vladimir Petrovich Potapov, ulitsa Mira, 12, kv. 12, all of Nizhny Tagil Sverdlovskoi oblasti, U.S.S.R.

[22] Filed: Feb. 15, 1975

[21] Appl. No.: 443,038

[52] U.S. Cl. ............... 260/33.4 R; 260/38; 260/57; 260/58
[51] Int. Cl. .......................... C08g 5/18; C08g 51/04
[58] Field of Search ............. 260/58, 33.4 R, 38, 57

[56] References Cited
UNITED STATES PATENTS
2,120,585  6/1938  Weelands ............................ 260/58
3,010,919  11/1961  Mackinney et al. ............. 260/58 X
3,156,670  11/1964  Soldatos ............................... 260/58

Primary Examiner—Donald E. Czaja
Assistant Examiner—S. M. Person
Attorney, Agent, or Firm—Waters, Schwartz & Nissen

[57] ABSTRACT

A method of producing phenolic moulding materials based upon orthoregular-structure phenol-aldehyde resins consists in that a polycondensation reaction occurs between the phenolic component and the anhydrous aldehyde component taken in a molar ratio of 1 to 0.3–1.5, respectively, in the presence of a filling agent, some additives and an alcohol selected from the group, consisting of mono- and dihydric alcohols which contain 2 to 8 carbon atoms and is taken in a ratio of 1 to 10 weight parts per 100 weight parts of the phenolic component, the reaction proceeding at 130° to 250°C for a period of time long enough to obtain a moulding material having a maximum weight percentage content of volatiles equal to 7.

9 Claims, No Drawings

METHOD OF PRODUCING PHENOLIC MOULDING MATERIALS

The present invention relates to a method of producing phenolic moulding materials based upon orthoregular-structure phenol-aldehyde resins.

As it is commonly known phenolic moulding materials made on the base of orthoregular-structure phenol-aldehyde resins, possess a number of valuable properties, mostly due to their high curing rate.

The known methods of producing such materials are multi-staged processes involving a preliminary preparing of resins followed by producing the moulding materials therefrom by intermixing the resins with appropriate filling agents, accelerants, colourants and some other additives.

Wood flour, cotton cellulose, asbestos and fibreglass are most oftentimes used as fillers in the production of phenolic moulding materials.

Besides, the composition is given some additives incorporating a lubricating agent in the capacity of which use can be made of stearin, calcium stearate, or oleic acid. To increase the heat resistance of the material, kaolin or talc is introduced into the composition thereof, whereas calcium oxide or magnesium oxide is added thereto as a curing accelerant.

To impart the desired colour to the moulding material, some appropriate colourants are introduced into the composition thereof.

U.S. Pat. No. 2,475,587 and British Pat. No. 615,335 disclose a method of producing phenol-formaldehyde resins featuring a high content of ortho-bonds, by condensing phenol with aqueous formaldehyde solutions in a molar ratio of 2:1 in the presence of oxides of zinc, magnesium and aluminium.

However, when condensation occurs with a considerable excess of phenol, too low a yield of the reaction product results. Besides, to produce a moulding material based upon orthoregular-structure resins one more stage is involved, i.e., blending the obtained resins with the filler and additives. FRG Pat. No. 1,022,005 and French Pat. No. 1,115,410 specify a method of producing rapidly curing ortho-structure resins by condensing phenol with aqueous formaldehyde solutions with a molar ratio of 2:1 in the presence of zinc acetate and the salts of barium, strontium, calcium, magnesium, manganese, zinc, cadmium, lead. The method is featured, however, by too low a yield of the end product (72 percent of the phenol weight).

Producing phenolic moulding material by the aforesaid method involves an extra stage consisting in blending the obtained resin with the required fillers and additives.

West German Pat. No. 1,149,167 and U.S. Pat. No. 3,083,183 propose some novel ortho-orienting catalysts, viz., boric acid and borates of metals to produce orthoregular-structure resins.

Among the disadvantages of the method should be also a reduced mobility of the obtained moulding compound which may be prepared like in the preceding methods, only after preliminarily producing the resins.

Methods of producing phenolic moulding materials based on conventional novolaks which are devoid of orthoregular structure, are also multistaged and envisage a preliminary preparing of resins.

A disadvantage inherent in the known production processes of phenolic moulding materials based upon orthoregular-structure resins is the great number of steps involved in processing the starting reactants, viz., phenol and aldehydes into the end product, i.e., a moulding material, which is brought about by the fact that the production of resins and of moulding materials is carried out each in its particular reaction zone. Another disadvantage of said methods resides in the low yield of the products of the phenol-aldehyde condensation and the large amount of wastes in the form of ammonia liquor containing up to 8 percent phenol and requiring expensive treatment procedures.

It is a primary object of the present invention to provide a method that would make it possible to intensify the process of producing phenolic moulding materials basec upon orthoregular-structure resins.

It is another object of the present invention to decrease losses of the raw material and attain higher yield of the end product in producing phenolic moulding materials based upon orthoregular-structure resins.

It is one more object of the present invention to provide a method of producing phenolic moulding materials based upon orthoregular-structure resins which would avoid the formation of waste water.

Said objects are attained in a method for producing pheolic moulding materials of phenol-aldehyde resins having an orthoregular structure, consisting in that the phenolic component and an anhydrous aldehyde component taken at a molar ratio of 1 to 0.3–1.5, respectively are made to react in the presence of a filler, some additives for phenolic moulding materials and a mono- or dihydric alcohol, containing 2 to 8 carbon atoms and taken in a ratio of 1–10 weight parts per 100 weight parts of the phenolic component, at temperatures of 130° to 250°C within a period of time necessary to form moulding material with a maximum volatiles content of 7 wt.%.

Blending of the composition can be carried out preliminarily in a separate apparatus or in the same apparatus where the end product, viz., phenolic moulding material is produced.

Use of anhydrous aldehyde components avoids the presence of waste water which usually accompanies production of phenolic moulding compounds, as well as permits a higher rate of phenol-aldehyde condensation.

The proposed ratio between the phenolic and aldehyde components ensures the production of moulding materials at a reasonably high yield. The presence of mono- and dihydric alcohols, containing 2 to 8 carbon atoms, adds to the plasticity of the moulding material and increases the conversion factor of the starting phenolic and aldehyde components. Carrying out the phenol-aldehyde condensation reaction in the presence of a filler enables the process of producing phenolic moulding material to be carried out in a single stage, thus dispensing with the separate resin preparing step and, consequently, highly intensifying the process and cutting down losses of the raw material at intermediate stages thereof.

It is expedient that wood flour, cotton cellulose, asbestos or fibreglass be used as fillers in the proposed phenolic moulding materials.

As additives used in preparing phenolic moulding materials, it is expedient to apply those employed conventionally in producing such materials to impart the required properties thereto. Thus, kaolin and talc are used as an additive increasing heat resistance of phenolic moulding materials, while magnesium-oxide and calcium-oxide additives are used as curing accelerators. The additives of stearin, calcium stearate or oleic acid are used as lubricant agents.

The fact that the process runs at reasonably high temperatures (130° to 250°C) affords the possibility of producing the moulding materials at the required degree of polycondensation of phenol-aldehyde resins which enables the process to be carried out in a single stage and take little time (2 to 5 min) to occur.

Carrying out of the process at a temperature below 130°C sharply reduces the rate of the phenol-aldehyde condensation reaction.

Carrying out of the process at a temperature above 250°C involves many process-technique difficulties because of failure to accurately govern the temperature conditions of the process.

A maximum content of 7 weight percent volatiles in the finished moulding material ensures that the latter is processed into items having high performance characteristics.

The volatiles include the unreacted phenol, aldehydes and moisture that may form in the course of the polycondensation reaction.

Production of condensation products featuring orthoregular structure is ensured by the condensation conditions at elevated temperatures in a weak-acid anhydrous medium and is corroborated by IR-spectroscopy data. The IR-spectrum of the moulding material produced by the proposed method, is characterized by intensive absorption bands at 760 $cm^{-1}$ and much less intensive absorption at 830 $cm^{-1}$. The percentage content of ortholinkages in the phenolic moulding materials prepared by the proposed method, ranges within 60 to 80 of the total amount of ortho- and para-linkages.

It is expedient that the phenolic components be phenol, tricresol, xylenol or a mixture thereof, including the phenol fraction of coal tar. Dihydric phenols such as resorcinol can also be used.

Said phenolic components ensure the production of phenolic moulding materials possessing the properties that enable them to be processed into finished products characterized by high heat resistance, mechanical strength and electrical characteristics. The components in question are readily available on industrial scale and serve as an inexpensive raw material.

It is preferred to use paraform, urotropine, furfural or mixtures thereof as an anhydrous aldehyde raw stock.

Said aldehyde components are widely available from industry, while carrying out the polycondensation reaction in an anhydrous medium results in an increased production efficiency of the reaction vessels due to more complete utilization of the useful space thereof, and contributes to the formation of largely orthoregular-structure phenol-aldehyde resins.

Maximum effect is obtained when using paraform-urotropine or furfural-urotropine mixtures.

Unlike the heretofore known methods, wherein urotropine is introduced into phenol-aldehyde resins as a curing agent at the subsequent stages of their processing, in the hereinproposed method urotropine like other aldehydes serves as a resin-forming agent and can be used in the polycondensation reaction with phenol as a single aldehyde compenent.

According to the invention, the phenolic component and the aldehyde component, viz., paraform and/or urotropine are taken in a molar ratio of 1:(1.5–0):(0–0.4), respectively, and the phenolic component and the aldehyde component, viz., furfural and/or urotropine are taken in a molar ratio of 1:(1.5–0):(0–0.4), respectively, the sum of the aldehyde components being always equal to or in excess of 0.3 mole per mole of the phenolic component.

The expression written as (1.5–0) or (0–0.4) in the above ratio is to be understood so that with the paraform-to-phenolic-component molar ratio of 1.5:1.0, the urotropine content equals zero and, accordingly, with the urotropine-to-phenolic-component molar ratio of 0.4:1.0, the paraform content equals zero as well.

However, an indispensable prerequisite holds true of all the cases that the sum of the aldehyde components be always equal to or in excess of 0.3 mole per mole of the phenolic component.

The afore-described considerations refer equally to the case of using furfural and urotropine.

It is preferred that as mono- and dihydric alcohols ethylene glycol, diethyleneglycol, 1-n-octanol (caprylic alcohol), 2-ethylhexanol (octyl alcohol) be used in a ratio of 1-10 weight parts per 100 weight parts of the phenolic component.

The aforesaid alcohols feature high boiling point, low volatility, and good compatibility with the ingredients of the composition used for producing phenolic moulding materials which allow them to be employed under the conditions of the proposed method.

The practicable amounts of said alcohols (1 to 10 weight parts per 100 weight parts of the phenolic component) are the optimum ones. An alcohol content below 1 weight part per 100 weight parts of the phenolic component badly affects the yield of the polycondensation reaction products and impairs the plasticity of the phenolic moulding material obtained; conversely, in case of the alcohol content in excess of 10 weight parts per 100 weight parts of the phenolic component, the water proofness and physico-mechanical characteristics of the moulding material are markedly deteriorated.

It is recommended that 100 to 130 weight parts of the filler be used per 100 weight parts of the phenolic component.

Said ratio of the ingredients constituting the composition for producing phenolic moulding materials provides for the required degree of impregnation of the filler with phenol-aldehyde resins which makes it possible to produce phenolic moulding material possessing the required physico-mechanical, electrical and some other properties.

The proposed phenolic moulding material is expediently produced in an extrusion machine at 130° to 170°C.

Running of the process in an extrusion machine enables the reaction of phenol-aldehyde condensation to occur on a filler with vigorous stirring and an exact control of the process temperature conditions.

Besides, the use of an extrusion machine as the reaction apparatus makes it possible to carry out the method of producing phenolic moulding material as a continuous process.

The proposed method features the following advantages.

1. The production flowsheet is much simplified because a separate stage, viz., preliminary production of resins, is dispensed with.

2. Due to the use of anhydrous reactants in conjunction with the conducting of the process at elevated temperatures, the rate of phenol-aldehyde condensation is much increased which makes it possible to cut down the duration of the production cycle as compared to the known methods.

3. As a result of the reduced number of process steps the loss of raw stock is diminished, while the yield of the end product is increased.

4. Application of anhydrous aldehyde components ensures the production of phenolic moulding materials involving no chemically contaminated effluents.

5. Orthoregular structure of phenol-aldehyde condensation products imparts plasticity to phenolic moulding materials and provides for high curing rate.

6. The proposed method allows of producing the moulding compounds both with powderlike and fibrous organic and mineral fillers.

In what follows the invention is illustrated in a disclosure of a specific and preferred embodiment of the method proposed therein.

According to the invention, in order to produce quick-curing moulding materials on the base of phenol-aldehyde resins having orthoregular structure and a wood filler, there are taken phenol, wood flour, urotropine, paraform and the necessary additives, said components being continuously fed, by means of weighing batchers, into an extrusion machine, and taken in the following proportion (parts by weight):

| | |
|---|---|
| phenol | 36.4 (0.39 mole) |
| urotropine | 13.2 (0.09 mole) |
| paraform | 3.2 (0.1 mole) |
| wood flour | 39.8 |
| 1-n-octanol (caprylic alcohol) | 1.0 |
| kaolin | 3.3. |
| colourant | 1.5 |
| calcium oxide | 0.8 |
| stearin | 0.7 |

The extrusion machine is provided with heaters. In said machine are carried out: intermixing of the composition ingredients, polycondensation reaction and homogenization at 145° to 150°C, formation of phenol-aldehyde condensation products with an increased content of ortho-bonds which occurs immediately on the filler particles.

Volatiles that evolve during heat treatment process in the extrusion machine are vacuum-exhausted. The material leaving the extrusion machine is granulated in a granulator device and cooled down to 50°–60°C so as to rapidly stop the polycondensation reaction.

The resultant moulding material features the following qualitative characteristics:

| | |
|---|---|
| density, g/cm$^3$ | 1.30 |
| impact strength, kgf/cm$^2$ | 7.5 |
| ultimate flexural strength, kgf/cm$^2$ | 850 |
| Martens test temperature, °C | 169 |
| water absorption, mg | 25 |
| mobility, mm | 165 |
| surface resistivity, Ohm | $1.0 \cdot 10^{14}$ |
| volume resistivity, Ohm/cm | $2.0 \cdot 10^{13}$ |
| dielectric strength, kV/mm | 18 |
| curing time, sec | 40 |
| shrinkage percent | 0.51 |
| volatiles percentage content | 3.1 |

The percentage content of orthoregular bonds in the phenol-aldehyde condensation products obtained by the proposed method is equal to 75. Orthoregular structure of the phenol-aldehyde condensation products imparts a number of valuable properties to the phenolic moulding materials thus prepared: high curing rate, high mechanical strength characteristics and plasticity which enables said materials to be processed by the most advanced technique, viz., die-casting process.

In what follows the invention is illustrated in the specific exemplary embodiments of the proposed method.

EXAMPLE 1

Phenol, urotropine, wood flour and some additives are fed, by means of weighing batchers, into a continuous mixing machine, in the following proportion (parts by weight):

| | |
|---|---|
| phenol | 36.4 (0.39 mole) |
| urotropine | 16.2 (0.12 mole) |
| wood flour | 39.8 |
| ethyleneglycol | 0.7 |
| kaolin | 4.0 |
| colourant | 1.5 |
| calcium oxide | 0.8 |
| stearin | 0.7 |

The composition obtained in the mixing machine is continuously fed into a heated extrusion machine.

Polycondensation reaction occurs at 130°C. Upon leaving the extrusion machine the material is subjected to granulation in a granulator device and is cooled.

The thus-obtained moulding material features the following qualitative characteristics:

| | |
|---|---|
| density, g/cm$^3$ | 1.34 |
| impact strength, kgf/cm$^2$ | 9.0 |
| ultimate flexural strength, kgf/cm$^2$ | 900 |
| Martens test temperature, °C | 175 |
| water absorption, mg | 45 |
| mobility, mm | 170 |
| surface resistivity, Ohm | $9 \cdot 10^{13}$ |
| volume resistivity, Ohm/cm | $3.8 \cdot 10^{13}$ |
| dielectric strength, kV/mm | 16 |
| curing time, sec | 50 |
| shrinkage percent | 0.51 |
| volatile matter percentage content | 5.0 |

EXAMPLE 2

Under the conditions of Example 1 the components are taken in the following proportion (parts by weight):

| | |
|---|---|
| tricresol | 35 (0.32 mole) |
| paraform | 14.4 (0.48 mole) |
| cotton cellulose | 35 |
| 2-ethylhexanol (octyl alcohol) | 0.35 |
| talc | 10.0 |
| magnesia | 1.0 |
| oleic acid | 4.25 |

The process temperature in the extrusion machine is 170°C.

The resultant moulding material features the following qualitative characteristics:

| | |
|---|---|
| density, g/cm$^3$ | 1.52 |
| impact strength, kgf/cm$^2$ | 10.5 |
| ultimate flexural strength, kgf/cm$^2$ | 923 |
| Martens test temperature, °C | 191 |
| water absorption, mg | 55 |
| mobility, mm | 126 |
| surface resistivity, Ohm | $3.5 \cdot 10^{12}$ |
| volume resistivity, Ohm/cm | $1.0 \cdot 10^{11}$ |

-Continued

| | |
|---|---|
| dielectric strength, kV/mm | 6 |
| shrinkage percent | 0.41 |
| curing time, sec | 60 |
| volatile matter percentage content | 4.1 |

EXAMPLE 3

Under the conditions of Example 1 the components are taken in the following proportion (parts by weight):

| | |
|---|---|
| xylenol | 24.4 (0.2 mole) |
| urotropine | 5.6 (0.04 mole) |
| furfural | 25.0 (0.26 mole) |
| wood flour | 31.7 |
| diethyleneglycol | 1.4 |
| kaolin | 7.9 |
| colourant | 2.0 |
| calcium oxide | 1.0 |
| calcium stearate | 1.0 |

Polycondensation reaction in the extrusion machine occurs at 250°C.

The resultant moulding material features the following qualitative characteristics:

| | |
|---|---|
| density, g/cm$^3$ | 1.37 |
| impact strength, kgf/cm$^2$ | 6.1 |
| ultimate flexural strength, kgf/cm$^2$ | 710 |
| Martens test temperature, °C | 180 |
| water absorption, mg | 50 |
| mobility, mm | 154 |
| surface resistivity, Ohm | $6.0 \cdot 10^{14}$ |
| volume resistivity, Ohm/cm | $2.3 \cdot 10^{13}$ |
| dielectric strength, kV/mm | 14 |
| curing time, sec | 60 |
| shrinkage percent | 0.60 |
| volatile matter percentage content | 2.5 |

EXAMPLE 4

Under the conditions of Example 1 the components are taken in the following proportion (parts by weight):

| | |
|---|---|
| phenolic fraction | 36.1 (0.38 mole) |
| asbestos | 43.8 |
| paraform | 14.9 (0.49 mole) |
| urotropine | 1.4 (0.01 mole) |
| 1-n-octanol | 1.0 |
| calcium oxide | 1.0 |
| oleic acid | 1.8 |

Polycondensation reaction in the extrusion machine runs at 250°C.

The thus-obtained moulding material features the following qualitative characteristics:

| | |
|---|---|
| impact strength, kgf/cm$^2$ | 25 |
| ultimate flexural strength, kgf/cm$^2$ | 700 |
| Martens test temperature, °C | 180 |
| water absorption, mg | 50 |
| shrinkage percent | 0.6 |
| volatile matter percentage content | 3.5 |

EXAMPLE 5

Under the conditions of Example 1 the components are taken in the following proportion (parts by weight):

| | |
|---|---|
| phenol | 35 (0.37 mole) |
| paraform | 13.9 (0.46 mole) |
| urotropine | 5.8 (0.04 mole) |
| wood flour | 38 |
| 1-n-octanol | 0.7 |
| kaolin | 3.9 |
| colourant | 1.3 |
| magnesia | 0.8 |
| calcium stearate | 0.6 |

Polycondensation reaction is carried out in a twin-screw-type extrusion machine at a temperature of 145°C.

The resultant moulding material features the following qualitative characteristics:

| | |
|---|---|
| density, g/cm$^3$ | 1.38 |
| impact strength, kgf/cm$^2$ | 7.26 |
| ultimate flexural strength, kgf/cm$^2$ | 858 |
| Martens test temperature, °C | 175 |
| water absorption, mg | 22 |
| mobility, mm | 161 |
| surface resistivity, Ohm | $7.08 \cdot 10^{13}$ |
| volume resistivity, Ohm/cm | $2.7 \cdot 10^{13}$ |
| dielectric strength, kV/mm | 17 |
| curing time, sec | 50 |
| shrinkage percent | 0.57 |
| volatile matter percentage content | 6.0 |

EXAMPLE 6

Under the conditions of Example 3, as an aldehyde component furfural is taken in an amount of 28.8 weight parts (0.3 mole).

The resultant moulding material features qualitative characteristics similar to those stated in Example 3.

EXAMPLE 7

The components of the composition stated in Example 1, are charged immediately into the extrusion machine featuring length-to-diameter ratio equal to 35. In said extrusion machine there are carried out, under the conditions of Example 1, the intermixing of the ingredients of said composition, polycondensation reaction and homogenization.

The phenolic moulding material produced as in Examples 1 to 7, is processed into finished items by compression or cast moulding, as well as by die-casting techniques.

What is claimed is:

1. A method of producing phenolic moulding materials based upon orthoregular-structure phenol-aldehyde resins, consisting in polycondensation reaction between a phenolic component and an anhydrous aldehyde component taken in a molar ratio of 1 to 0.3–1.5, respectively in the presence of a filling agent, conventional additives and an alcohol selected from the group, consisting of mono-and dihydric alcohols having 2 to 8 carbon atoms and taken in a ratio of 1 to 10 parts by weight per 100 parts by weight of the phenolic component, at 130° to 250°C for a period of time required to form a moulding material having a maximum volatile matter content of 7 wt.%.

2. A method as claimed in claim 1, wherein said phenolic component is selected from the group, consisting of phenol, tricresol, xylenol or mixtures thereof.

3. A method as claimed in claim 1, wherein said aldehyde component is selected from the group, consisting of paraform, urotropine, furfural or mixtures thereof.

4. A method as claimed in claim 1, wherein said aldehyde component is selected from the group consisting of paraform and urotropine and the phenolic component and the aldehyde component are taken in a molar ratio of 1:(1.5–0):(0–0.4) respectively, the sum of the aldehyde components being always equal to or in excess of 0.3 mole per mole of the phenolic component.

5. A method as claimed in claim 1, wherein said aldehyde is selected from the group consisting of furfural and urotropine and the phenolic component and the aldehyde component are taken in a molar ratio of 1:(1.5–0):(0–0.4) respectively, the sum of the aldehyde components being always equal to or in excess of 0.3 mole per mole of the phenolic component.

6. A method as claimed in claim 1, wherein said alcohol is selected from the group, consisting of ethyleneglycol, diethyleneglycol, 1-n-octanol, and 2-ethylhexanol (octyl alcohol).

7. A method as claimed in claim 1, wherein 100 to 130 weight parts of the filler are taken per 100 weight parts of the phenolic component.

8. A method as claimed in claim 6, wherein 100 to 130 weight parts of the filler are taken per 100 weight parts of the phenolic component.

9. A method as claimed in claim 1, wherein the process of producing phenolic moulding material is carried out in an apparatus of the extruder type at a temperature from 130° to 170°C.

* * * * *